United States Patent
Rohall et al.

(10) Patent No.: US 7,392,280 B2
(45) Date of Patent: Jun. 24, 2008

(54) METHOD FOR SUMMARIZATION OF THREADS IN ELECTRONIC MAIL

(75) Inventors: Steven L. Rohall, Winchester, MA (US); Derek Lam, Arlington, MA (US); Mia Stern, Andover, MA (US); Paul B. Moody, Hyde Park, VT (US); Daniel M. Gruen, Newton, MA (US); Christopher M. Schmandt, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 10/328,455

(22) Filed: Dec. 23, 2002

(65) Prior Publication Data

US 2003/0158903 A1    Aug. 21, 2003

Related U.S. Application Data

(63) Continuation-in-part of application No. 09/995,151, filed on Nov. 27, 2001.

(60) Provisional application No. 60/351,932, filed on Jan. 25, 2002, provisional application No. 60/352,364, filed on Jan. 28, 2002.

(51) Int. Cl.
*G06F 15/16* (2006.01)
*G06F 17/00* (2006.01)

(52) U.S. Cl. .................. 709/201; 715/500; 715/514

(58) Field of Classification Search .............. 709/201; 715/500, 514
See application file for complete search history.

(56) References Cited

U.S. PATENT DOCUMENTS

| | | | |
|---|---|---|---|
| 5,991,756 A * | 11/1999 | Wu | 707/3 |
| 6,533,822 B2 * | 3/2003 | Kupiec | 715/531 |
| 2002/0143871 A1 * | 10/2002 | Meyer et al. | 709/204 |
| 2003/0014434 A1 * | 1/2003 | Sebesta | 707/500 |

* cited by examiner

*Primary Examiner*—Kenny Lin
(74) *Attorney, Agent, or Firm*—David A. Dagg

(57) ABSTRACT

The present invention discloses a pre-processing summarization technique that makes use of knowledge specific to the electronic mail domain to pre-process an electronic mail message so that commercially-available document summarization software can subsequently generate a more useful summary from the message. The summarization technique removes extraneous headers, quoted text, forward information, and electronic signatures, leaving more useful text to be summarized. If an enclosing electronic mail thread exists, the summarization technique uses the electronic mail message's ancestors to provide additional context for summarizing the electronic mail message. The disclosed system can be used with IBM Lotus Notes and Domino infrastructure, along with existing single-document summarizer software, to generate a summary of the discourse activity in an electronic mail thread dynamically. The summary may be further augmented to list any names, dates, and names of companies that are present in the electronic mail message being summarized.

5 Claims, 16 Drawing Sheets

METHOD FOR SUMMARIZATION OF THREADS IN ELECTRONIC MAIL

This application claims priority to and is a continuation-in-part of commonly assigned U.S. application Ser. No. 09/995,151, filed Nov. 27, 2001, by Rohall et al., and entitled "METHOD AND APPARATUS FOR MAINTAINING CONVERSATION THREADS IN ELECTRONIC MAIL."

RELATED APPLICATIONS

This application claims priority to commonly assigned U.S. provisional applications:

Ser. No. 60/351,932, filed Jan. 25, 2002, by Moody et al., and entitled "METHOD AND APPARATUS FOR SUMMARIZATION OF THREADS IN ELECTRONIC MAIL"; and Ser. No. 60/352,364, filed Jan. 28, 2002, by Moody et al., and entitled "METHOD AND APPARATUS FOR ELECTRONIC MAIL INTERACTION"

FIELD OF THE INVENTION

This invention relates, generally, to data processing systems and, more specifically, to a technique for effectively summarizing electronic mail and electronic mail threads.

BACKGROUND OF THE INVENTION

Electronic mail has become one of the most widely used business productivity applications. However, people increasingly feel frustrated by their electronic mail. They are overwhelmed by the volume, lose important items, and feel pressure to respond quickly. Though electronic mail usage has changed, electronic mail clients have changed little since they were first invented. Although today's electronic mail clients are more graphical with onscreen buttons, pull-down menus and rich-text display, they are essentially derivative programs of the electronic mail clients from thirty years ago. Most electronic mail clients today have the same set of features and organizational structures: multiple folders in which messages can be filed, a textual listing of the messages within a given folder, and the ability to preview a selected message. However, studies have shown that folder systems quickly degrade with the number of messages people receive. Most people end up keeping all of their electronic mail in one large folder. The content and use of electronic mail has also changed. In addition to traditional letters, electronic mail now consists of invitations, receipts, transactions, discussions, conversations, tasks, and newsletters, to name a few variations.

Information overload motivates the need for automatic document summarization programs. The incentive, from a corporate standpoint, is that users need the ability to decide quickly which threads to examine, and which entries in a thread might be interesting.

Electronic mail threads are groups of replies that, directly or indirectly, are responses to an initial electronic mail message. While many utilities and theories have been developed to address the problem of summarizing single documents, little known work has been done specifically with regard to electronic mail thread summarization. Electronic mail messages, unlike archival documents, are often short, informal, and not well-formed. When commercially-available document summarization programs are used on electronic mail, the resulting summaries lack context, instead often containing electronic mail signatures or header fields mentioned in electronic mail messages. The summary results for a single electronic mail message become more relevant when additional context, represented by the electronic mail thread enclosing the message, is used. Electronic mail threads provide valuable context for summarizing electronic mail messages, and allow document summarization programs to exploit the structure of electronic mail not found in other documents.

International Business Machines Corporation has published an algorithm for summarizing discussion databases, such as Usenet newsgroups or Notes discussion groups. However, application of such an algorithm to the task of summarizing electronic mail threads presents difficulties, as electronic mail threads differ from discussion databases in a number of ways. For example, discussion databases archive all of the content of discussion groups. As a result, discussion group summarizers never have to deal with deleted documents when analyzing threads.

Second, discussion groups do not have to address a thread discovery problem because they have a true parent-child hierarchy. Third, electronic mail contains additional structure, which discussion group summarizers do not exploit.

Accordingly a need exists for a way to summarize electronic mail in a manner that produces meaningful results.

A further need exists for a way to summarize complete electronic mail threads so that such summaries may be presented in a useful manner to a user.

SUMMARY OF THE INVENTION

The present invention discloses a technique that makes use of knowledge specific to the electronic mail domain to pre-process an electronic mail message so that commercially-available document summarization software can generate a more useful summary from the message. The summarization algorithm removes extraneous headers, quoted text, forward information, and electronic mail signatures, to leave more useful text to be summarized. Furthermore, if an enclosing electronic mail thread exists, the inventive algorithm makes use of the electronic mail message's ancestors to provide additional context for summarizing the electronic mail message. In the illustrative embodiment, summarization of an electronic document and its accompanying conversation thread may occur automatically and substantially simultaneously with the generation a "shadow" document. Alternatively, summarization of an individual electronic document may occur upon request of a user through selection of a menu item on a graphic user interface or other command interface.

More specifically, the invention contemplates two objectives. First, how commercially-available document summarization programs can be made to work better on a single electronic mail message when that message is pre-processed, making use of domain-specific knowledge about electronic mail. Second, how to provide better summaries by using electronic mail threads to provide additional context for any given message. The system leverages structure inherent in electronic mail messages and electronic mail threads to provide a better summary of the electronic mail message than simply running the electronic mail message through the document summarization program with no pre-processing. Feature extraction and electronic mail message pre-processing are used to generate useful summaries. The disclosed system can be used with an electronic mail infrastructure such as IBM Lotus Notes and Domino, along with existing single-document summarizer software, to generate a summary of the discourse activity in an electronic mail thread dynamically. The summary may optionally be further augmented to list any names, dates, and names of companies that are present in the electronic mail message being summarized.

In the inventive summarization algorithm, the selected or current document, typically an electronic mail document, is preprocessed (by stripping signatures, etc.) to create an intermediate document. The intermediate document is then summarized with a document summarization module and the output thereof added to a summary document. Each ancestor document of the current document, i.e. parent, grandparent, etc., is similarly preprocessed into its own intermediate document. Each ancestor intermediate document is then summarized with a document summarization module and the output thereof added to the summary document. When all ancestor documents within a conversation thread have been preprocessed and summarized, the summary document is finished.

According to a first aspect of the invention, in a computer system operatively coupled to a network and capable of executing a communication process for sending and receiving electronic mail documents, a method comprises: (A) preprocessing an electronic mail document to selectively remove electronic mail features prior to document summarization; (B) summarizing the electronic mail document and storing the results therefrom in a summary document; (C) identifying an ancestor document of the electronic mail document, if any; (D) preprocessing the ancestor document to selectively remove electronic mail features; (E) summarizing the ancestor document and adding results thereof to the summary document; (F) repeating (C) through (E) until all ancestor documents of the electronic mail document have been summarized.

According to a second aspect of the invention, an apparatus for use with a computer system operatively coupled to a network and capable of executing a communication process for sending and receiving electronic mail documents, comprises: (A) a preprocessor for preprocessing an electronic mail document to selectively remove electronic mail features prior to document summarization; (B) a document summarizer responsive to a preprocessed electronic mail document for generating a summary document; and (C) program logic for identifying any ancestor document of the electronic mail document and causing any ancestor document to be preprocessed by the preprocessor and summarized by the document summarizer and the results thereof added to the summary document.

According to a third aspect of the invention, in a computer system operatively coupled to a network and capable of executing a communication process for sending and receiving electronic mail documents, a method comprises: (A) summarizing a document existing at a current level of a hierarchical organization; (B) storing the results of the summarization process of (A) in a summary document; (C) identifying a document that exists at a level of the hierarchical organization adjacent the current level; (D) designating the adjacent level of the hierarchical organization as the current level of the hierarchical organization; and (E) repeating (A) through (D) until no document exists at a level of the hierarchical organization adjacent the current level. In one embodiment, the summarization process comprises extracting any of extraneous headers, quoted text, forward information, and electronic signatures from a document during the summarization process.

According to a fourth aspect of the invention, a computer program product and computer data signal for use with a computer system operatively coupled to a network and capable of executing a communication process for sending and receiving electronic mail documents, comprises (A) program code for summarizing a document existing at a current level of a hierarchical organization; (B) program code for storing the results of the summarization process in (A) in a summary document; (C) program code for identifying a document that exists at a level of the hierarchical organization adjacent the current level; (D) program code for designating the adjacent level of the hierarchical organization as the current level of the hierarchical organization; and (E) program code for repeatedly executing (A) through (D) until no document exists at a level of the hierarchical organization adjacent the current level.

BRIEF DESCRIPTION OF THE DRAWINGS

The above and further advantages of the invention may be better understood by referring to the following description in conjunction with the accompanying drawings in which.

DETAILED DESCRIPTION

Figure 1:
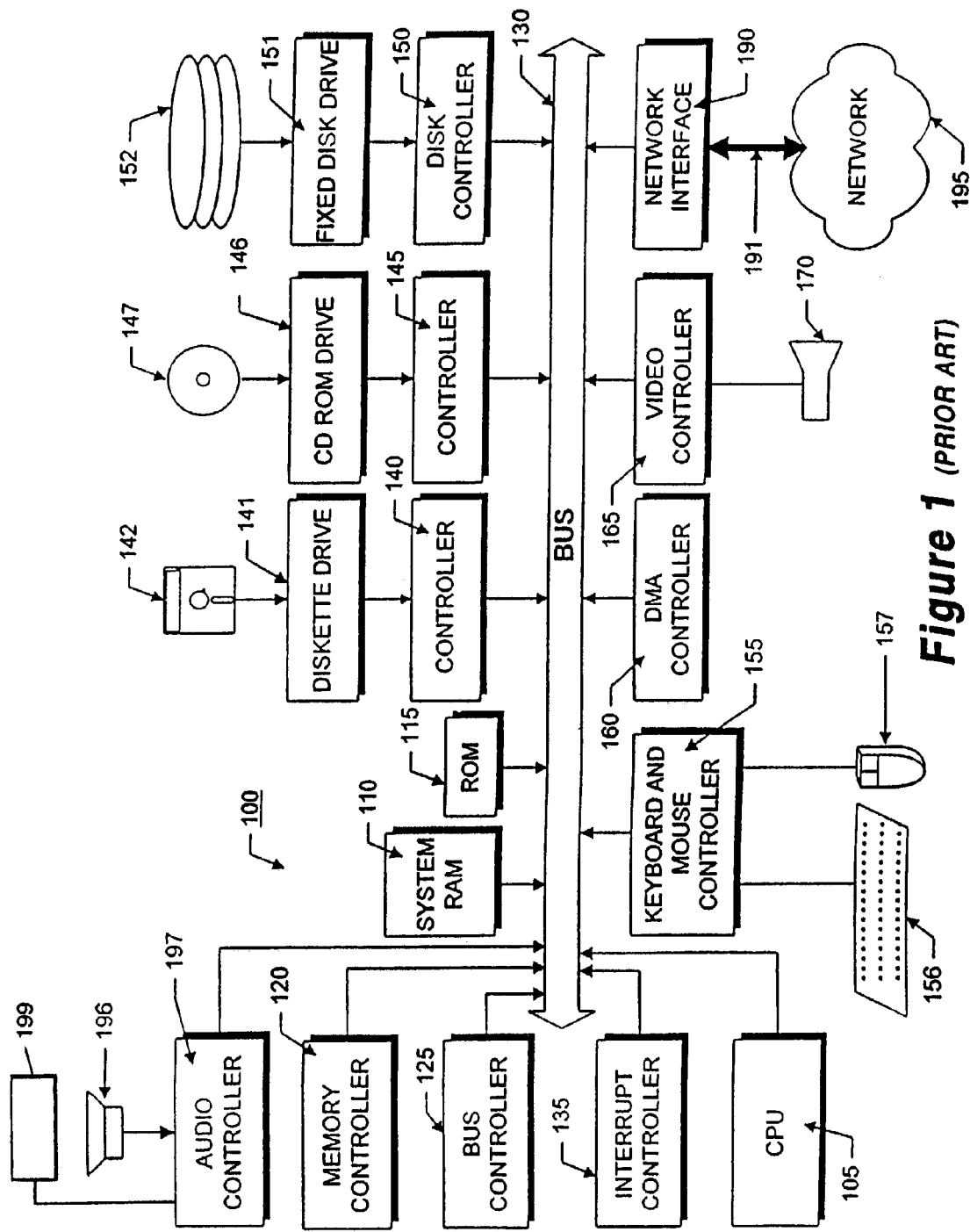
FIG. 1 is a block diagram of a computer systems suitable for use with the present invention.

FIG. 1 illustrates the system architecture for a computer system 100, such as a Dell Dimension 8200, commercially available from Dell Computer, Dallas Tex., on which the invention can be implemented. The exemplary computer system of FIG. 1 is for descriptive purposes only. Although the description below may refer to terms commonly used in describing particular computer systems, such as an IBM Think Pad computer, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146, which is connected to bus 130 by controller 145. Hard disk 152 is part of a fixed disk drive 151, which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DMA controller 160 is provided for performing direct memory access to system RAM 110. A visual display is generated by video controller 165 which controls video display 170. In the illustrative embodiment, the user interface of a computer system may comprise a video display and any accompanying graphic user interface presented thereon by an application or the operating system, in addition to or in combination with any keyboard, pointing device, joystick, voice recognition system, speakers, microphone or any other mechanism through which the user may interact with the computer system. Computer system 100 also includes a communications adapter 190, which allows the system to be interconnected to a local area network (LAN) or a wide area network (WAN), schematically illustrated by bus 191 and network 195.

Figure 2:
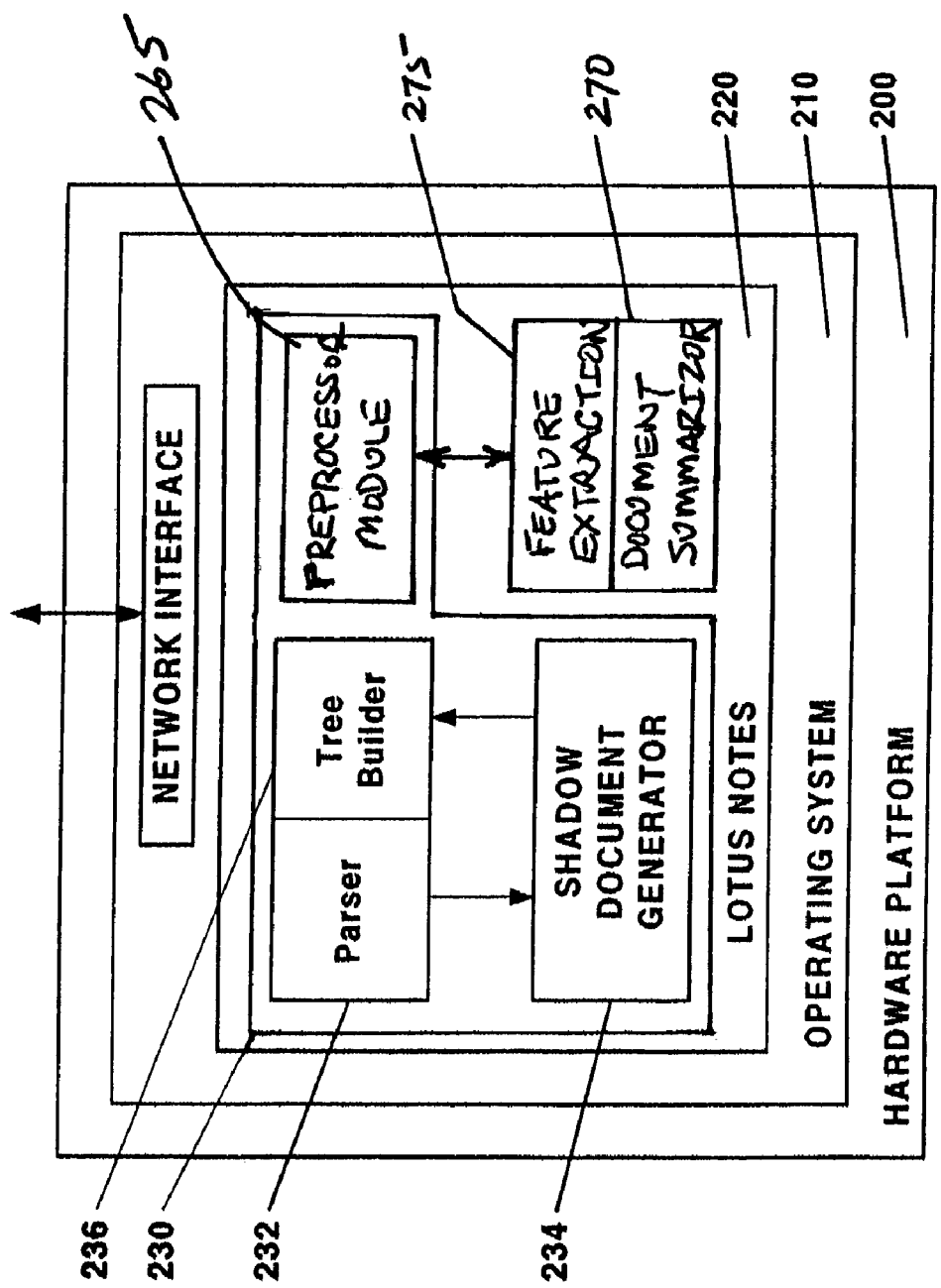
FIG. 2 illustrates conceptually the relationship between the components of the system in which the present invention may be utilized.

Computer system 100 is generally controlled and coordinated by operating system software, such as the WINDOWS NT, WINDOWS XP or WINDOWS 2000 operating system, commercially available from Microsoft Corporation, Redmond Wash. The operating system controls allocation of system resources and performs tasks such as process scheduling, memory management, and networking and I/O services, among other things. In particular, an operating system resident in system memory and running on CPU 105 coordinates the operation of the other elements of computer system 100. The present invention may be implemented with any number of commercially available operating systems including OS/2, AIX, UNIX and LINUX, DOS, etc. The relationship among hardware 200, operating system 210, and user application(s) 220 is shown in FIG. 2. One or more applications 220 such as Lotus Notes or Lotus Sametime, both commercially available from International Business Machines Corporation, Armonk, N.Y., may execute under control of the operating system 210. If operating system 210 is a true multitasking operating system, multiple applications may execute simultaneously.

In the illustrative embodiment, the present invention may be implemented using object-oriented technology and an operating system which supports execution of object-oriented programs. For example, the inventive code module may be implemented using the C++ language or as well as other object-oriented standards, including the COM specification and OLE 2.0 specification for MicroSoft Corporation, Redmond, Wash., or, the Java programming environment from Sun Microsystems, Redwood, Calif.

In the illustrative embodiment, the elements of the system are implemented in the Java programming language using object-oriented programming techniques. Java is a compiled language, that is, programs are written in a human-readable script and this script is then provided to another program called a compiler which generates a machine-readable numeric code that can be loaded into, and directly executed by, a computer. As described below, the Java language has certain characteristics which allow a software developer to easily use programs written by others while still providing a great deal of control over the reuse of programs to prevent their destruction or improper use. The Java language is well-known and many articles and texts are available which describe the language in detail. In addition, Java compilers are commercially available from several vendors including Borland International, Inc. and Microsoft Corporation. Accordingly, for reasons of clarity, the details of the Java language and the operation of the Java compiler will not be discussed further in detail herein.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

Network Environment

The illustrative embodiment of the invention may be implemented as part of Lotus Notes® (client and a Lotus Domino server, both commercially available from Lotus Development Corporation, Cambridge, Mass., a subsidiary of International Business Machines Corporation, Armonk, N.Y., however it will be understood by those reasonably skilled in the arts that the inventive functionality may be integrated into other applications as well as the computer operating system.

The Notes architecture is built on the premise of databases and replication thereof. A Notes database, referred to hereafter as simply a "database", acts as a container in which data Notes and design Notes may be grouped. Data Notes typically comprises user defined documents and data. Design Notes typically comprise application elements such as code or logic that make applications function. In Notes, every database has a master copy which typically resides on the server or user platform where the database was created. All other copies of the database are replicas of the master copy. Replicas of databases may be located remotely over a wide area network, which may include as a portion thereof one or more local area networks. In the illustrative every object within a Notes database, is identifiable with a unique identifier, referred to hereinafter as "Note ID", as explained hereinafter in greater detail.

A "document" as used herein may refer to a document, database, electronic mail message code, a "Note" or any file which is accessible and storable by a computer system. The Notes Storage Facility (NSF) architecture defines the manner in which documents and databases are created, modified and replicated among Notes servers across a computer network. Information regarding the Notes Storage Facility and its specification is available from Lotus Development Corporation as well as on-line at www.Notes.net.

Figure 3:
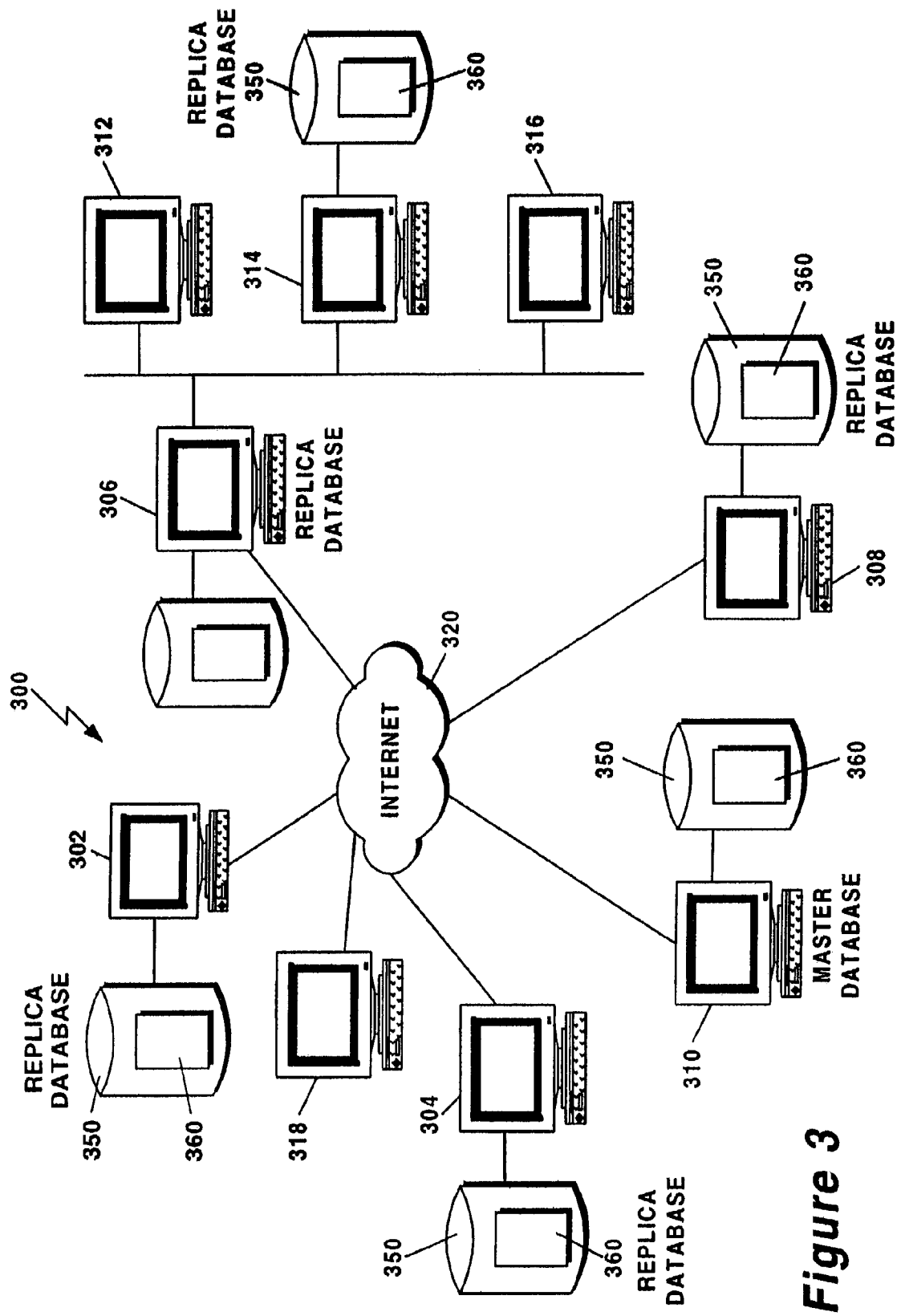
FIG. 3 is a conceptual illustration of a computer network environment in which the present invention may be utilized.

FIG. 3 illustrates a network environment in which the invention may be practiced, such environment being for exemplary purposes only and not to be considered limiting. Specifically, a packet-switched data network 300 comprises servers 302-310, a plurality of Notes processes 310-316 and a global network topology 320, illustrated conceptually as a cloud. One or more of the elements coupled to global network topology 320 may be connected directly or through Internet service providers, such as America On Line, Microsoft Network, Compuserve, etc. As illustrated, one or more Notes process platforms may be located on a Local Area Network coupled to the Wide Area Network through one of the servers.

Servers 302-308 may be implemented as part of an all software application which executes on a computer architecture similar to that described with reference to FIG. 1. Any of the servers may interface with global network 320 over a dedicated connection, such as a T1, T2, or T3 connection. The Notes client processes 312, 314, 316 and 318, which include mail functionality, may likewise be implemented as part of an all software application that run on a computer system similar to that described with reference to FIG. 1, or other architecture whether implemented as a personal computer or other data processing system. As illustrated conceptually in FIG. 3, servers 302-310 and Notes client process 314 may include in memory a copy of database 350 which contains document 360. For purposes of illustration, the copy of database 350 associated with server 310 is designated as the "master" copy of database 350. All other copies of database 350 within the network are replica copies of the master copy.

Shadow Document Generation

To implement the functionality of the present invention in a Lotus Notes environment, a module, referred to hereafter as Notes Mail Agent 230 interacts with the existing functionality, routines or commands of Lotus Notes client application and/or a Lotus "Domino" server, many of which are publicly available. The Lotus Notes client application, referred to hereafter as application 220, executes under the control of the operating system 210 which in turn executes within the hardware parameters of hardware platform 200. Hardware platform 200 may be similar to that described with reference to FIG. 1. Mail Agent 230 interacts with application 220 and with one or more document 350 in databases 360. The functionality of Mail Agent 230 and its interaction with application 220 and databases 360 is described hereafter. In the illustrative embodiment, module 230 may be implemented in an object-oriented programming language such as C++. Accordingly, the data structures and functionality may be implemented with objects displayable by application 220 or groups of objects. In light of the description herein, the construction and function of module 230 is within the scope of understanding of those reasonably skilled in the arts.

Mail Agent 230 comprises a parser 232, a shadow document generator 234 and a conversation thread tree builder 236. The primary function of Notes Mail Agent 230 is to create a shadow document from an original document, which, in the illustrative embodiment, is an electronic mail message. Typically, this process is triggered by an occurrence of an event. In the first illustrative embodiment, Mail Agent module 230 may be invoked upon the sending of an electronic mail message by a Lotus Notes client application. In this instance, Agent 230 may reside within the Lotus Notes client, as illustrated in FIG. 2 or on the same system. Simultaneously, a Lotus Notes Mail Agent 230 may execute on a Lotus Notes "Domino" server and function to create a shadow document for each document or electronic message transmitted from other non-Notes processes prior to delivery to a recipient Notes process. The shadow documents are generated transparent to the actual user sending or receiving the electronic message. Alternatively, in a second illustrative embodiment, described herein Mail Agent 230 may be invoked upon the receipt of a request to delete an original document or electronic mail message.

Mail Agent 230 creates a shadow document from an original document by generating a file containing data related to the document. In the illustrative embodiment, shadow documents are stored as documents in a Lotus Notes database and are accessible via the Notes Storage Facility (NSF) Application Program Interfaces. Specifically, shadow documents are stored in a Notes mail database. The data maintained in a shadow document defines the parent/child relationships among original documents and their respective shadow documents. In the illustrative embodiment, a new electronic mail message is considered a parent document and serves as the root from which a new shadow tree may be derived, as explained hereinafter. Any replies to the original electronic mail message is/are considered a child/children document(s). Within a conversation thread, and a hierarchical tree that represents such thread, children documents derive from a common root document. Accordingly, a parent/child tree hierarchy representing a conversation thread terminates at one extreme with a root document, or a shadow document thereof, and, at the other extreme, with one or more children documents, or shadows thereof, as the leaves of the tree.

Figure 4:
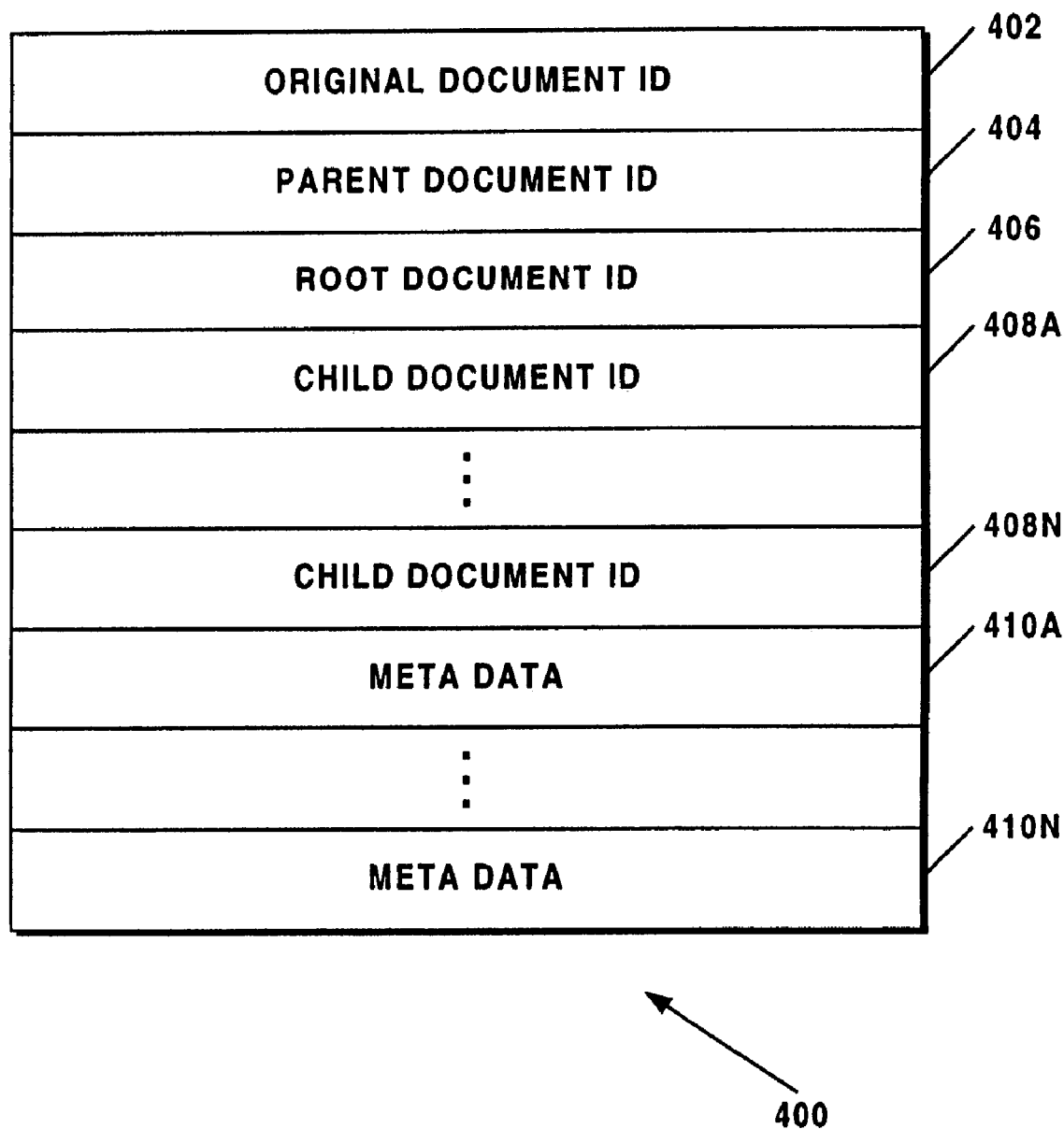
FIG. 4 is a conceptual illustration of a data structure in accordance with the present invention.

FIG. 4 illustrates conceptually the structure and content of a shadow document 400 in accordance with the present invention. As shown, shadow document 400 comprises an Original Document Identifier (ID) 402, a Parent Document ID 404, an optional Root Document ID 406, one or more Child Document IDs 408a-n, and optional Meta Data fields 410a-n. Original Document ID 402 may comprise a pointer to the original document, e.g. an electronic mail message, which may no longer exist in the database. Parent Document ID 404 may comprise a pointer to the immediate parent document, whether a shadow or original document, in the tree hierarchy. Parent Document ID 404 may have a null value if the subject document is the root of the conversation thread tree. Optional Root Document ID 406 may comprise a pointer to the root of the conversation thread tree, whether shadow or original. Root Document ID 406 allows for efficiency in traversing the tree hierarchy. Child Document IDs 408a-n may comprise a list of pointers to the immediate children documents, whether shadow or original, in the tree hierarchy, if any. In the illustrative embodiment the value of Ids 402-408 may be the Notes ID value for a document. Additionally, Meta Data fields 410a-n may comprise meta data describing the original electronic message documents and/or any attachments thereto.

In the illustrative embodiment, the meta data may include such logistical information as sender, receiver, original size, subject, date, any carbon copy recipients, etc. associated with the document. In addition, key words or summaries of the content of the document or any attachments may likewise be included. Such functionality may be performed by Mail Agent 230 with calls to commercially available products such as Intelligent Miner for Text from IBM Corporation, Armonk, N.Y., or KeyView from Verity, Sunnyvale, Calif., which then parse and filter the content to find key words or create summaries. The technique and algorithms for generating summaries of the content of the document or any attachments are described in greater detail hereinafter.

At the time a document, particularly an electronic message is generated, shadow document generator 234 includes code routines or objects, which, upon invocation sets up a shadow document and identifies any parent and/or child documents of the subject document, optionally, further identifies the root document of a conversation-thread tree to which the subject document is a member. A similar process is performed by the shadow document generator 234 of a Mail Agent 230 executing on a Domino server. Parser 232 includes code routines or objects, which, upon invocation sets up a shadow document and parses the original document and any header of the following data fields: sender, receiver, original size, subject, date, any carbon copy receivers, attachment names, etc. and makes call to filtering software modules, as necessary. A shadow file is stored in an electronic mail database which may then be replicated in the manner previously described in the Notes environment.

Figure 5A:
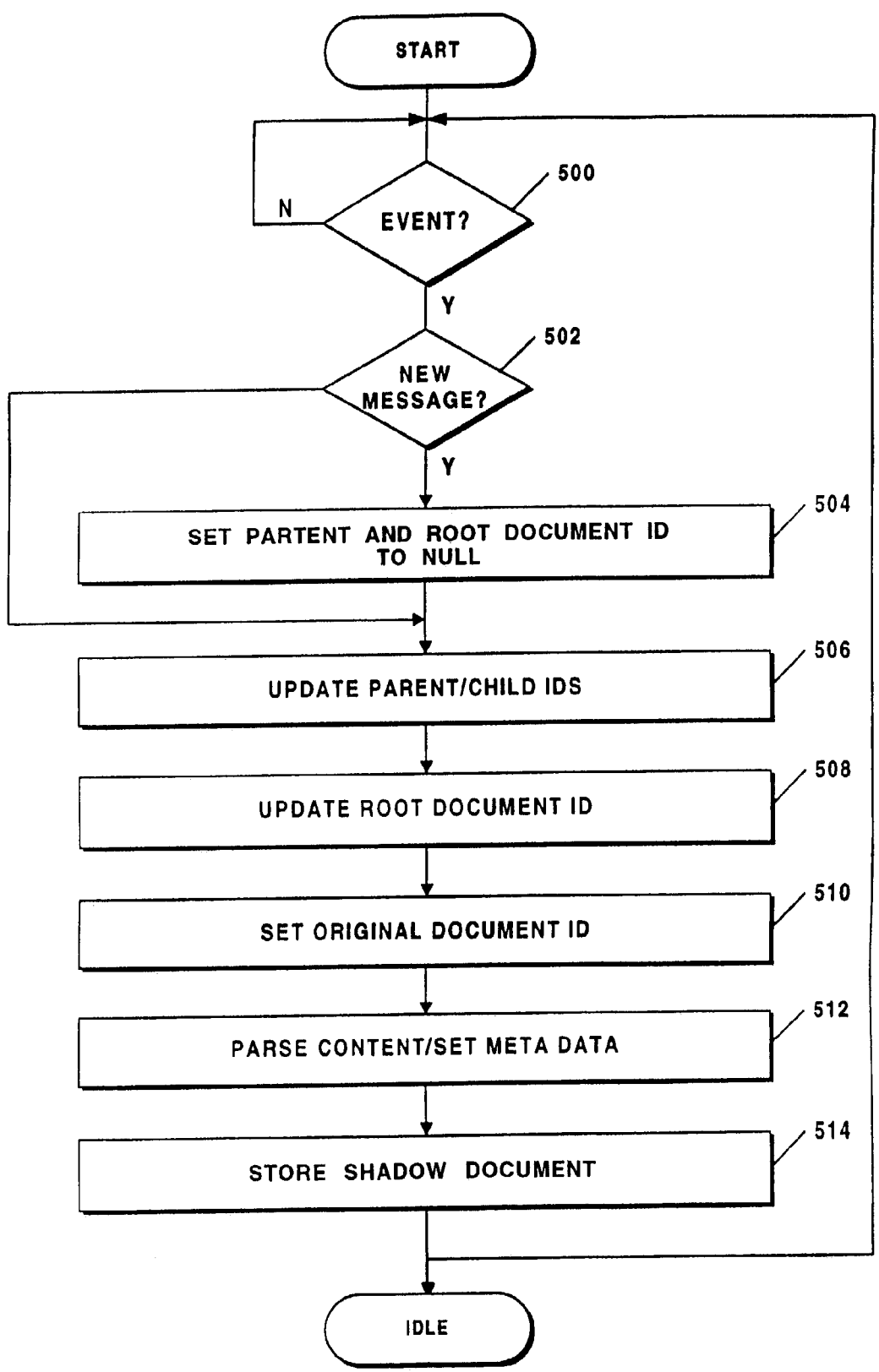
FIGS. 5A-B form a flow chart illustrating the process steps performed by the present invention.

FIGS. 5A and B are flow charts illustrating the process steps performed by parser 232 and shadow document generator 234 during the present invention. As illustrated in FIG. 5A, Mail Agent 230 first detects the occurrence of a triggering event as illustrated by decisional step 500. Such event may include the sending or receipt of an electronic message, or, alternatively a request to delete an electronic message. Next, Mail Agent 230 determines if the electronic message is a new message, as illustrated by decisional step 502. If so, Root Document ID 406 and Parent Document ID 404 are both set to null, as illustrated by procedural step 504. Otherwise, Mail Agent 230 sets the Parent Document ID 404 to a pointer value referencing the parent document and simultaneously modifies one of the Child Document IDs 408a-n of the parent document to reference the subject shadow document, as illustrated by procedural step 506. Additionally, Mail Agent 230 sets Root Document ID 406 to reference the root of the conversation thread tree, as illustrated by procedural step 508. Mail Agent 230 then sets the Original Document ID 402 to reference the original document from which the shadow document was created, as illustrated by procedural step 510. If the original document has been deleted, the value of Original Document ID 402 is set to null. Finally, Parser 232 parses the header information of the original electronic message for meta data and populates Meta Data fields 410a-n accordingly, as illustrated by procedural step 512. Parser 232 may optionally make procedure calls for scanning of the document content or any of its attachment for key words or phrases to be saved as meta data. Thereafter, the shadow document is stored in memory, which, in the illustrative embodiment, is a mail database, as illustrated by procedural step 514.

The above-described process is substantially the same whether the Mail Agent 230 resides in the Notes client or a Domino server in a Notes environment. In addition, if the triggering event in step 500 was a request for deletion of an original document, instead of pointing only to other shadow documents, the pointer values of the IDs 404-408 within shadow document 400 may also reference other original documents as well.

Given the content of shadow documents and their relationship to the original or root document, an algorithm in Tree Builder 236 can be used to traverse the chain of pointers or references to the parent of each shadow document, and, once the root has been identified, to then recursively traverse all references to each child document. In this manner, a complete parallel tree representing the conversation thread may be determined from the data collected by Tree Builder 236. The data identifying the documents or nodes of the tree, can then provided to program code which may visually render the tree for the users benefit, as discussed in greater detail herein.

Figure 5B:
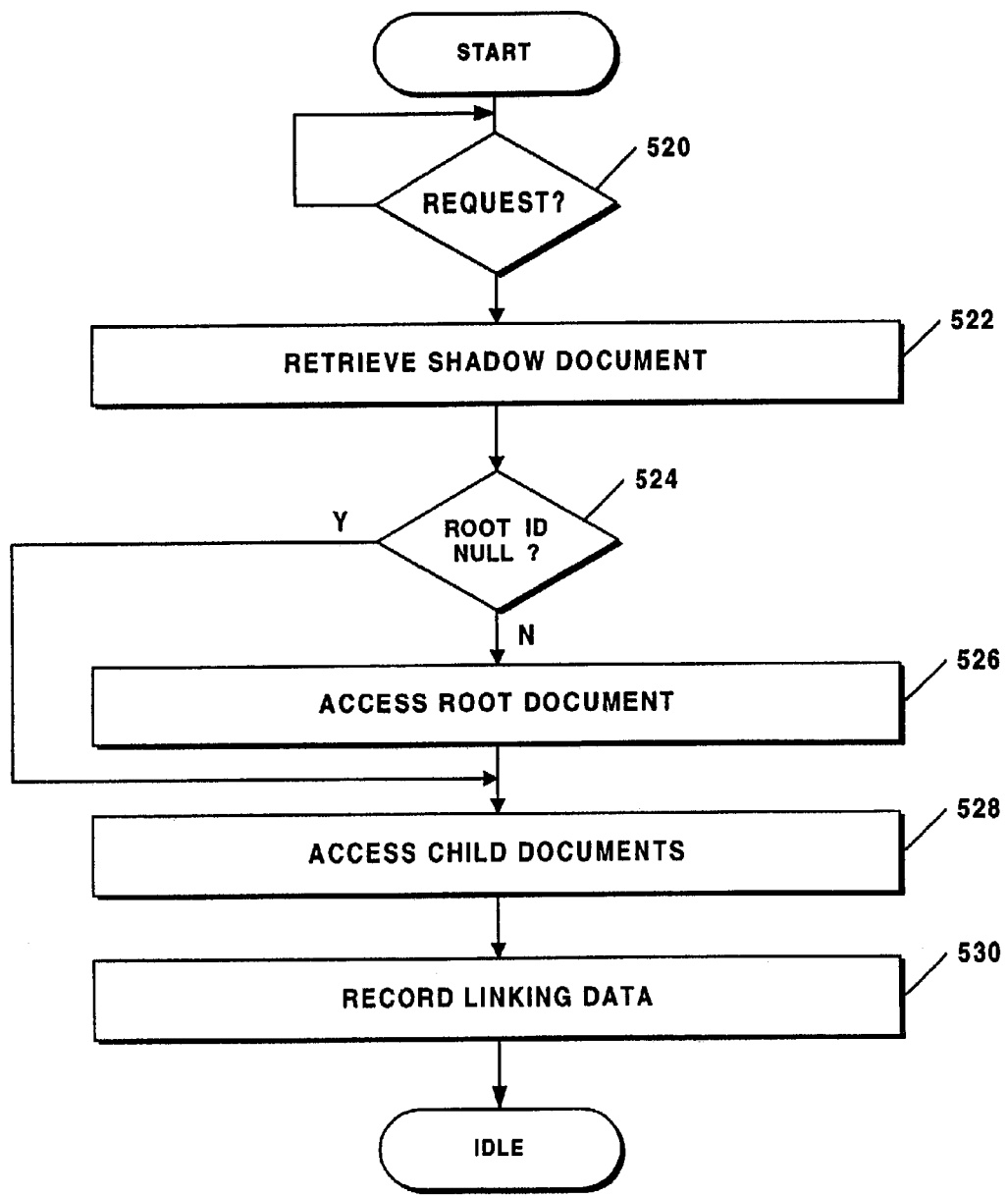

Referring to FIG. 5B, the process steps performed by conversation thread Tree Builder 236 is illustrated. Initially, Tree Builder 236 receives a request to construct a conversation thread tree, as illustrated by decisional step 520. Such request may be triggered by any number of different events including selection of a specific command within the Notes client application 220, automatically upon entering the mail function of the Notes client, or upon selection of an electronic message from a mail viewer utility. Tree Builder 236 receives the identifier of a document, typically a Notes ID, and retrieves the corresponding shadow document data from the mail database, as illustrated by procedural step 522. Next, Tree Builder 236 examines the Root Document ID field of the accessed shadow document and determines if the field contains a null value, as illustrated by decisional step 524. If the value of the Root Document ID field is not null, Tree Builder 236 retrieves the document identified by the pointer within the Root Document ID field, whether a shadow or original document, as illustrated by procedural step 526. Next, generator 236 resolves the child document IDs 408a-n in the Root Document, as well as each of their respective child documents, in a recursive manner, as will be understood by those reasonably skilled in the arts, until the Child Document IDs in all child documents are null, indicating that the leaf nodes within the conversation thread tree have been identified, as illustrated by steps 528. Tree Builder 236 progressively records the document IDs in a file during the resolution process and, upon completion, stores such data a file or document in memory, as illustrated by steps 530.

In an alternative implementation, since a large number of electronic mail messages are received, a large number of shadow documents will be generated. To reduce memory requirements, while still providing the functionality of the invention, the data from all shadow documents within a conversation thread may be stored in a single tree document within a Lotus Notes database, instead of multiply documents. In this embodiment, a single shadow document will include all of the meta data of the individual Notes within the tree, such document may be kept in the database using XML format or other markup language utilizing tags.

Visualization

With complete message thread information using the techniques described herein, visualization of conversation thread trees is possible. Since conversation thread trees, from observations, are not very deep nor very bushy in general, a simple graphical representation of the message thread and highlighting of the interesting relationships among the parties involved in the conversation is possible. The tree data compiled by generator 236 may then be provided to a graphics program for visually rendering a conceptual representation of a conversation thread tree. For example, the existing DiscussionsThreadsView functionality within Notes can be used to construct and display a complete conversation thread.

In the illustrative embodiment, we are using Lotus Domino for the underlying object store. The user interface may be developed using IBM Sash, a development environment based upon dynamic HTML and JavaScript. In one embodiment, a Java applet running in a portion of the Notes client gets the Notes document data representing the tree Notes from the data base and renders the tree graphically. Notes may be rendered with different graphic elements such as color to define relationships. By selecting of one of the nodes in a tree by user can, in one embodiment, cause a low resolution display of that document, either the original or the shadow document, to be displayed within the context of the tree.

Figure 6A:
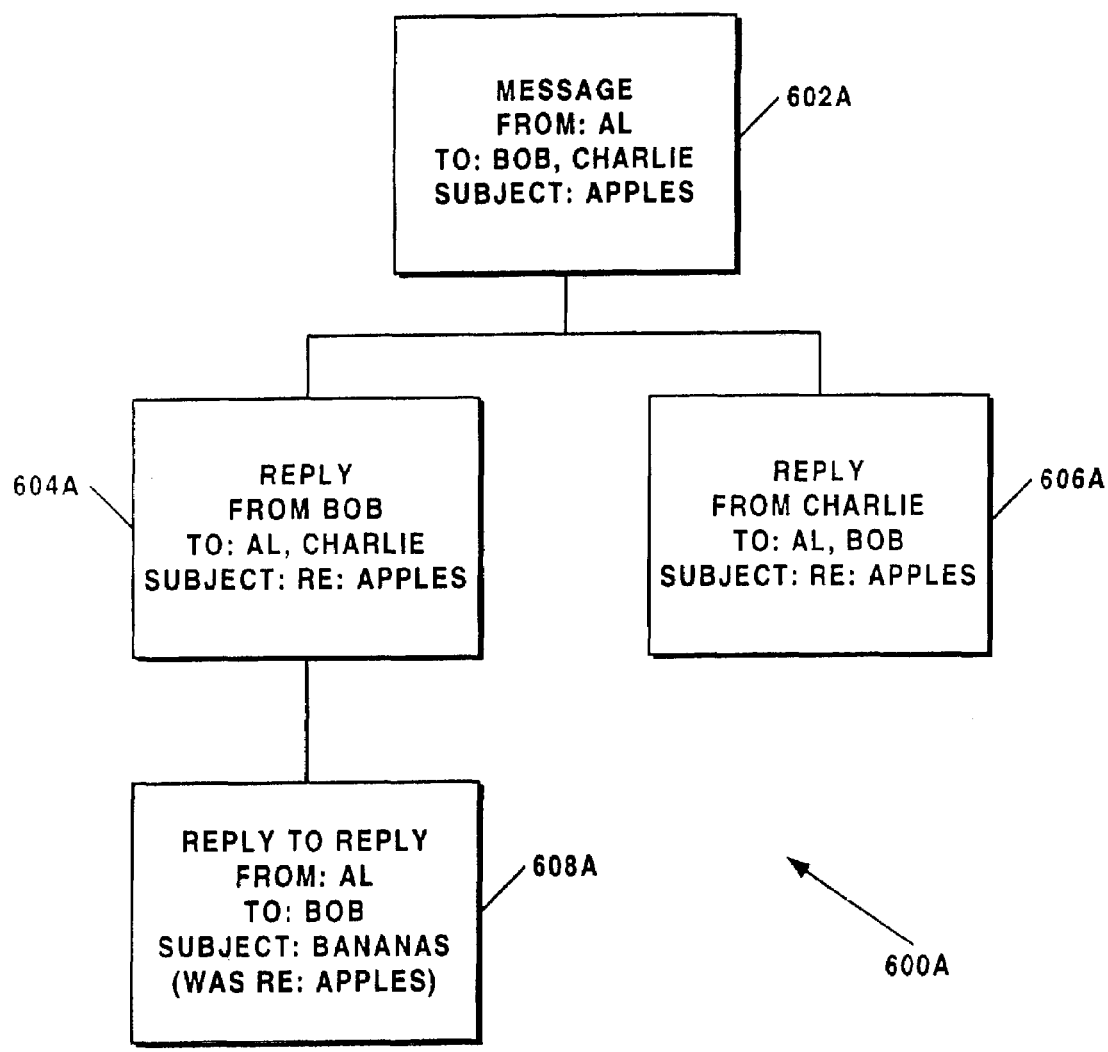
FIGS. 6A-D are conceptual illustrations of conversation-thread trees in accordance with the present invention.
Figure 6B:
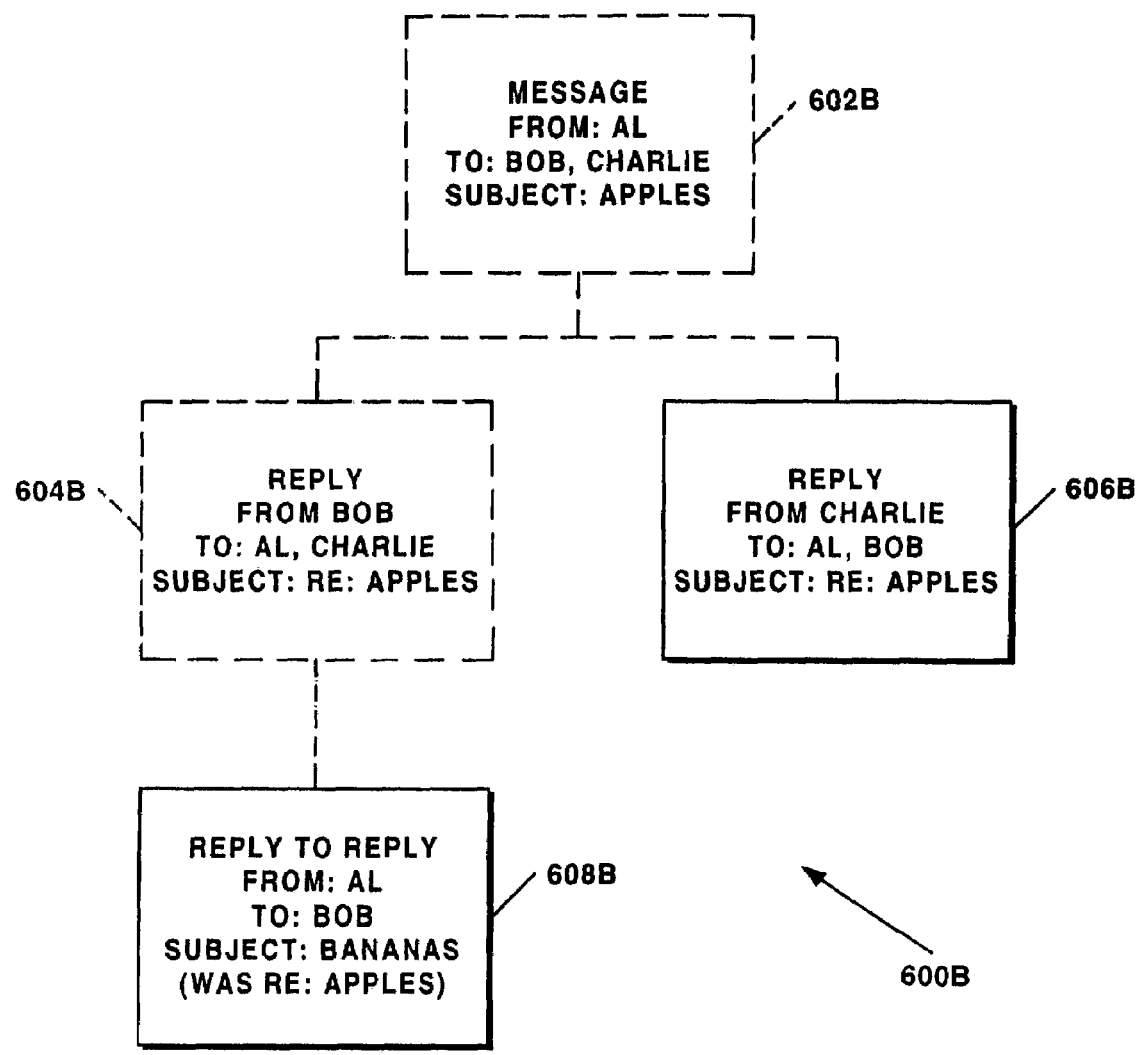
Figure 6C:
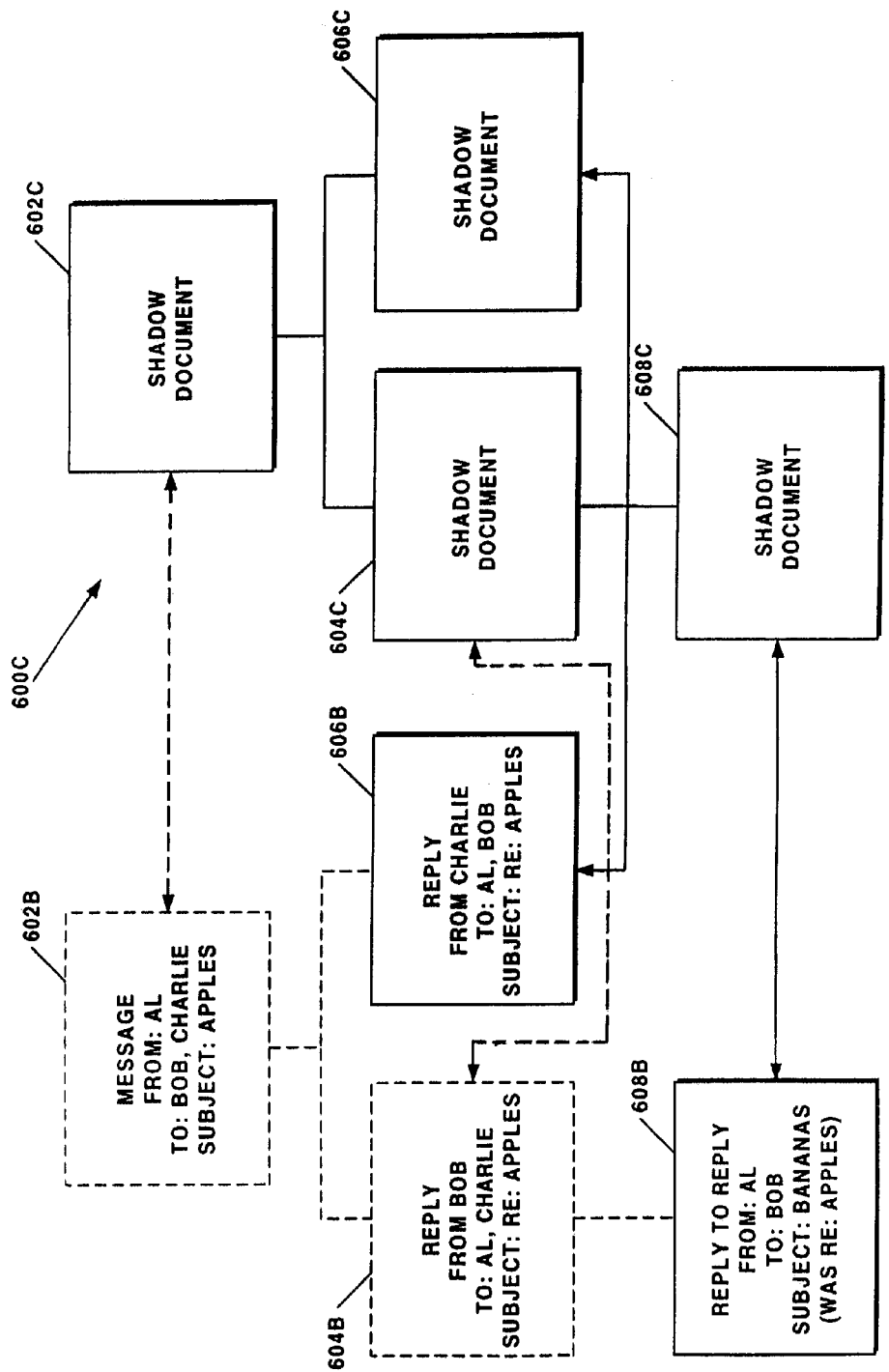
Figure 6D:
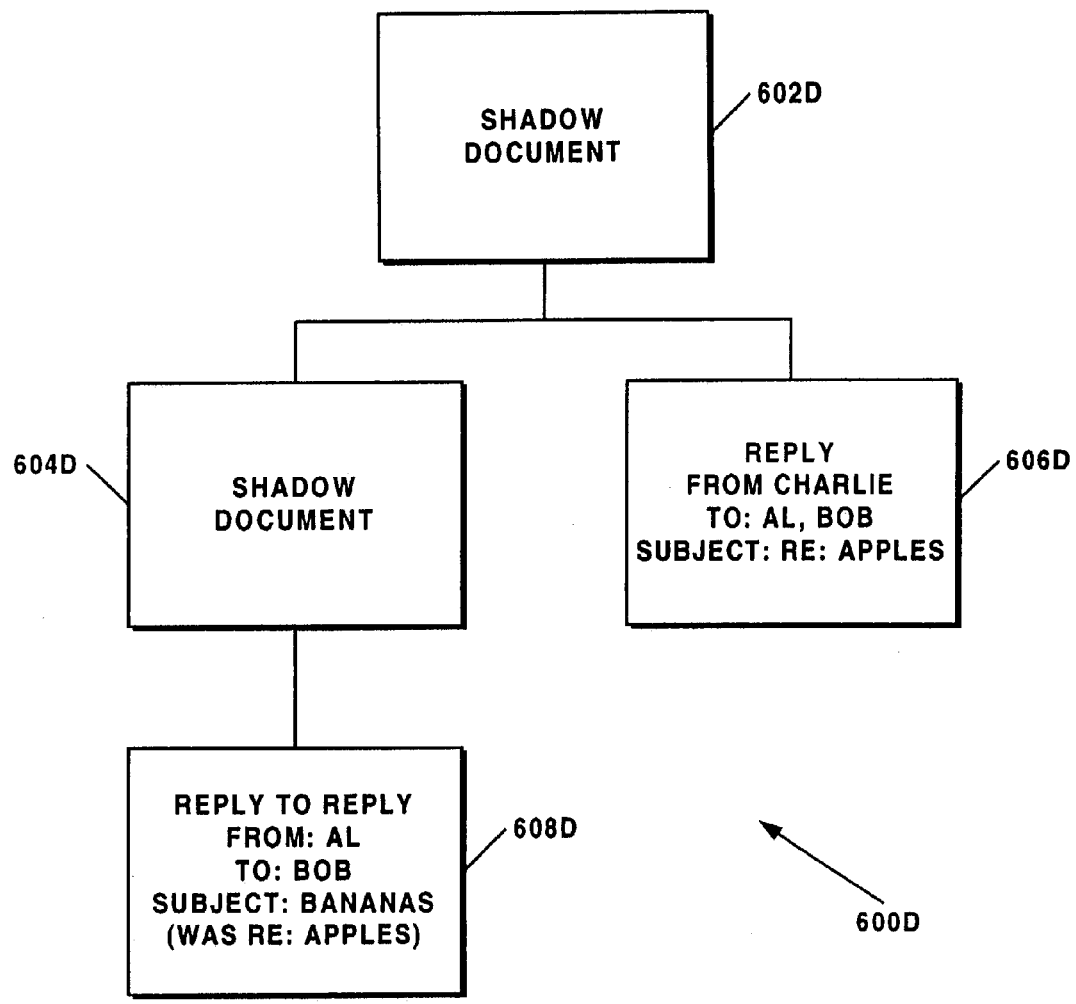

FIGS. 6A-D illustrate a conversation thread in the form of a document trees 600A-D. In FIG. 6A, tree 600A represents an original conversation thread in which an electronic message from Al to Bob and Charlie serves as the root document 602A of the tree 600A. Documents 604A, 606A, and 608A are replies or replies to replies and therefore child documents of parent/root document 602A. For the sake of illustration, assume that documents 602A and 604A are deleted by one or more of the respective recipients, resulting in the conversation thread tree 600B as illustrated in FIG. 6B. In FIG. 6B, documents 602B and 604B are shown in phantom, indicating that the original document has been deleted. With the present invention, a shadow tree 600C was created comprising documents 602C-608C, which are the shadow documents of documents 602A-608A, respectively. The relationship of shadow tree 600C and the original conversation thread tree 600A is illustrated in FIG. 6C. The shadow tree 600C remains in tact and may be constructed and viewed as necessary despite original documents 602A and 604A having been deleted. In an embodiment in which shadow documents are created upon a request to delete the original document, such as that illustrated in FIG. 6D, the conversation thread tree 600D is a hybrid tree consisting of shadow documents 602C-604C and original documents 606D and 608D.

Figure 7:
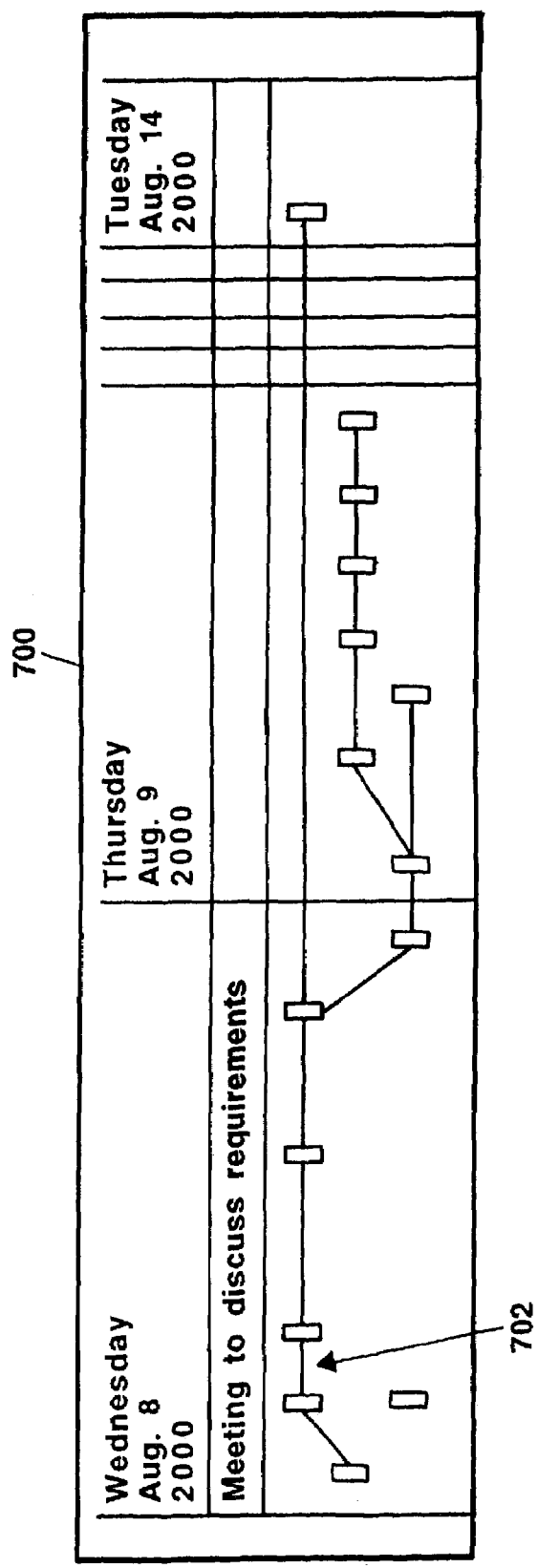
FIG. 7 is a conceptual illustration of an alternative conversation-thread tree superimposed with a time-line.

One attribute of electronic mail that is valuable to visualize is the time when a message was received. The present invention combines the message trees described above with a timeline to produce a more useful visualization. FIG. 7 illustrates a design for displaying a message tree 702 on a timeline 700. In FIG. 7, the vertical lines represent day boundaries. The text in the middle band is the subject of the thread. The nodes may be color-coded to indicate the relationship of the message senders to the recipient. Note that time is non-linear in this display; days with little or no activity are shown compressed to avoid the problem of large gaps in the time display. For example, a timeline can be broken to show a large passage of time. This might be useful if electronic mail is received from someone infrequently. In that case, the system could show on the timeline the most recent threads of conversation with that person. Also, information from people's calendars may be incorporated to aid in search. For example, a user might remember that he/she received a certain piece of mail just before going for vacation last summer. By incorporating these "milestones" on the timeline view the information can be found more easily. The present invention places message nodes proportionally within a day even though the width of a day on the timeline may vary.

Figure 8:
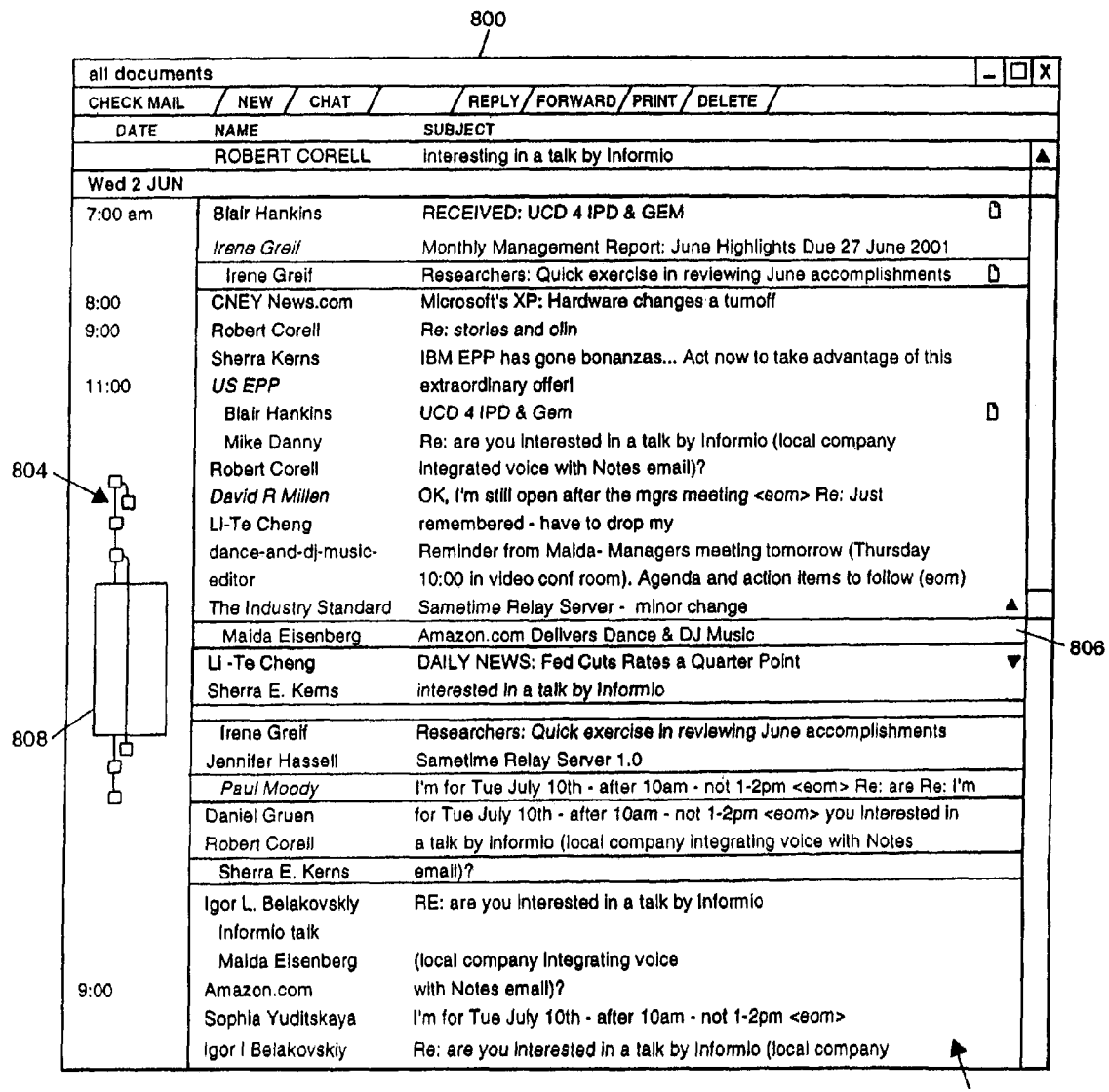
FIG. 8 is a conceptual illustration of a micro view of a document as part of a conversation-thread tree in accordance with the present invention.

The user interface 800 of an electronic mail client in accordance with the invention may have the format shown in FIG. 8. The user interface combines a traditional list of electronic mail messages 802 with a conversation tree 804. The node associated with the selected message 806 may be replaced with a reduced-resolution overview 808. Alternatively, the overview may be replaced with a window containing a summary of the electronic mail messages 802 and/or all or part of the conversation-thread tree 804, using the techniques described herein with reference to FIGS. 9-11. Also, a dimmer, secondary highlight or other graphic indicia may be used to highlight messages within list 802 which are also displayed in the conversation-thread tree 804.

Electronic Mail/Thread Summarization Algorithm

The illustrative embodiment of the present invention Mail Agent 230 may be implemented as part of Lotus Notes and Domino products from IBM Corporation and utilize the functionality of a commercially-available document summarization, such as IBM Intelligent Miner for Text, as a back-end module for processing electronic mail messages. The inventive algorithm described herein, however, is not specific to Lotus Notes, Domino or Intelligent Miner for Text, and may be implemented using any number of electronic mail systems and commercially-available document summarization programs. In the illustrative embodiment, a preprocessing module 265 of Mail Agent 230 takes, as input, an electronic mail message, makes appropriate calls to the document summarization module 270, and outputs a summary of the electronic mail message. The summarization algorithm performed by preprocessing module 265 uses knowledge specific to the electronic mail domain to pre-process an electronic mail message so that document summarization module 270 can generate a useful summary from the electronic mail message. The summarization algorithm removes extraneous headers, quoted text, forward information, and electronic mail signatures, to leave more useful text to be summarized. If an enclosing electronic mail thread exists, the summarization algorithm makes use of the electronic mail message's ancestors to provide additional context for summarizing the electronic mail message.

In the inventive summarization algorithm, the selected or current document, typically an electronic mail document, is preprocessed by preprocessing module 265, as described hereafter, to create an intermediate document d. The intermediate document d is then summarized with document summarization module 270 and the output thereof added to a summary document s. Each ancestor document p of the current document, i.e. parent, grandparent, etc., is similarly preprocessed into its own intermediate document d. Each ancestor intermediate document d is also then summarized with document summarization module 270 and the output thereof prepended to the summary document s. When all ancestor documents p within a conversation thread have been preprocessed and summarized, the summary document s is finished.

The specific details of the electronic mail message summarization algorithm are set forth below with reference to the flowcharts of FIGS. 9A-11. Upon selection of an electronic mail message m for summarization by mail agent 230 in accordance with one of the previously mentions scenarios, a temporary copy of message m is stored in memory, and the thread, if any, to which the message belongs is determine by preprocessing module 265, as illustrated by procedural step 900. This process can be performed using known algorithms for discovering message reply parent-child relationships, such as the getParentDocumentUNIDO( ) function found in Lotus Notes, the In-Reply-To header often found in electronic mail, or the shadow document method described earlier. If electronic mail message m belongs to an existing electronic mail thread, as illustrated by decisional step 902, the thread is processed by preprocessing module 265 to synthesize a new intermediate concept-level document d. In such process, preprocessing module 265 retrieves the first ancestor, i.e. parent p, of message m and compares electronic mail message m to parent p and any text quoted from the parent p by the "reply with history" functionality is removed, as illustrated by procedural step 904. Thereafter, any "To:", "Cc:", "Bcc:", and "From:" headers remaining in electronic mail message m are removed by preprocessing module 265, as illustrated by procedural step 906. Next, preprocessing module 265 removes any headers, as illustrated by procedural step 908 highlighted by the summarization module 270. If any "Subject:" headers are found by preprocessing module 265, the subject is included in the intermediate document d on a line by itself, as illustrated by procedural step 910, to give the intermediate document d more context. Next, any electronic signatures in electronic mail message m are identified and removed by preprocessing module 265, as illustrated by procedural step 912. This process may occur by matching a character string against any automatically-generated permutations of the character string in the "From:" header of electronic mail message m, and is described in greater detail with reference to the flowchart of FIG. 10. Since signatures tend to get highlighted by the summarization module 270, the signatures are removed. Once electronic mail message m has been preprocessed, the intermediate document d is then summarized by document summarization module 270 and the output thereof added to a summary document s, as illustrated by procedural steps 914 and 916.

Next, preprocessing module 265 determines if electronic mail message m has a parent p, as illustrated by decisional step 918. This process may occur using the same inquiry algorithms as in step 900. In the tree-like hierarchical organization of a message thread, parent and children documents exist at adjacent levels of the hierarchical organization. The parent document exists at a level above the current or child document, and the current or child document exists at a level below the parent document, along the tree-like hierarchy. If message m has a parent p, process steps 904-916 are repeated with electronic mail message m's parent p, instead of m, in a recursive manner, until all ancestors of message m have been preprocessed, summarized, and the resulting individual document summaries prepended into summary document s. Ancestors are any parent p of message m or any parent of a parent, etc., along the hierarchical organization of the conversation thread up to the root or original electronic document from which the thread developed.

Next, preprocessor 265 calls feature extraction module 275 and passes message m as the input thereto. The useful "features" found in the message, such as names, dates, and names of companies and/or products are extracted by feature extraction module 275 and the output thereof are added to the summary document s, as illustrated by procedural step 920. Thereafter, any dates mentioned in electronic mail message m are identified and extracted by preprocessing module 265 using expression matching and the results of the date extraction process added to the summary document s, as illustrated by procedural step 922.

If in step 902, it was determined that the electronic mail message m was not part of an existing thread, the message is parsed as the start of a new electronic mail thread with no ancestors, in a manner similar to that described with reference to steps 906-922, as explained herein.

Next, the summary document s generated by the summarization algorithm may be presented to the viewer and/or stored in memory, as illustrated by procedural step 924. In the illustrative embodiment described herein, the algorithm for summarization of electronic mail/threads can occur dynamically with the summarization data instantaneously presented to the user. For example, the summary of the electronic mail message and/or all or part of the conversation-thread may be displayed in a window on a user interface of a communication process, such as, for example, the user interfaces illustrated in FIGS. 7-8. Alternatively, the presentation of the summary of the electronic mail message/thread may have any presentation format desired by the system designer and allowable by the user interface of the electronic mail application and the operating system. Such a display may occur upon selection of an electronic mail message from within the list of electronic mail messages, or simply whenever hovering over an electronic mail message from within the list of electronic mail messages with a pointing device cursor In addition, the presentation may occur upon completion of the summarization of a complete electronic mail message thread or each time the summarization algorithm completes a summarization iteration associated with a document, allowing the viewer to see the summary grow progressively.

The data resulting from the electronic mail summarization process, either the message-specific intermediate documents d or the complete resulting summary document s may be stored in shadow document 400, as previously described. Similarly, the data resulting from summarization of the electronic mail/conversation thread may be stored in a single shadow document which includes all meta data and summarization data from a conversation tree. In such an embodiment, the shadow document containing the summarization of the complete conversation thread may be updated or recomputed each time a new electronic message related to the specific thread is summarized. Specific sub-algorithms used within the described technique for summarization of electronic mail/threads are described hereafter in greater detail.

Electronic Mail Signature Extraction

Figure 9A:
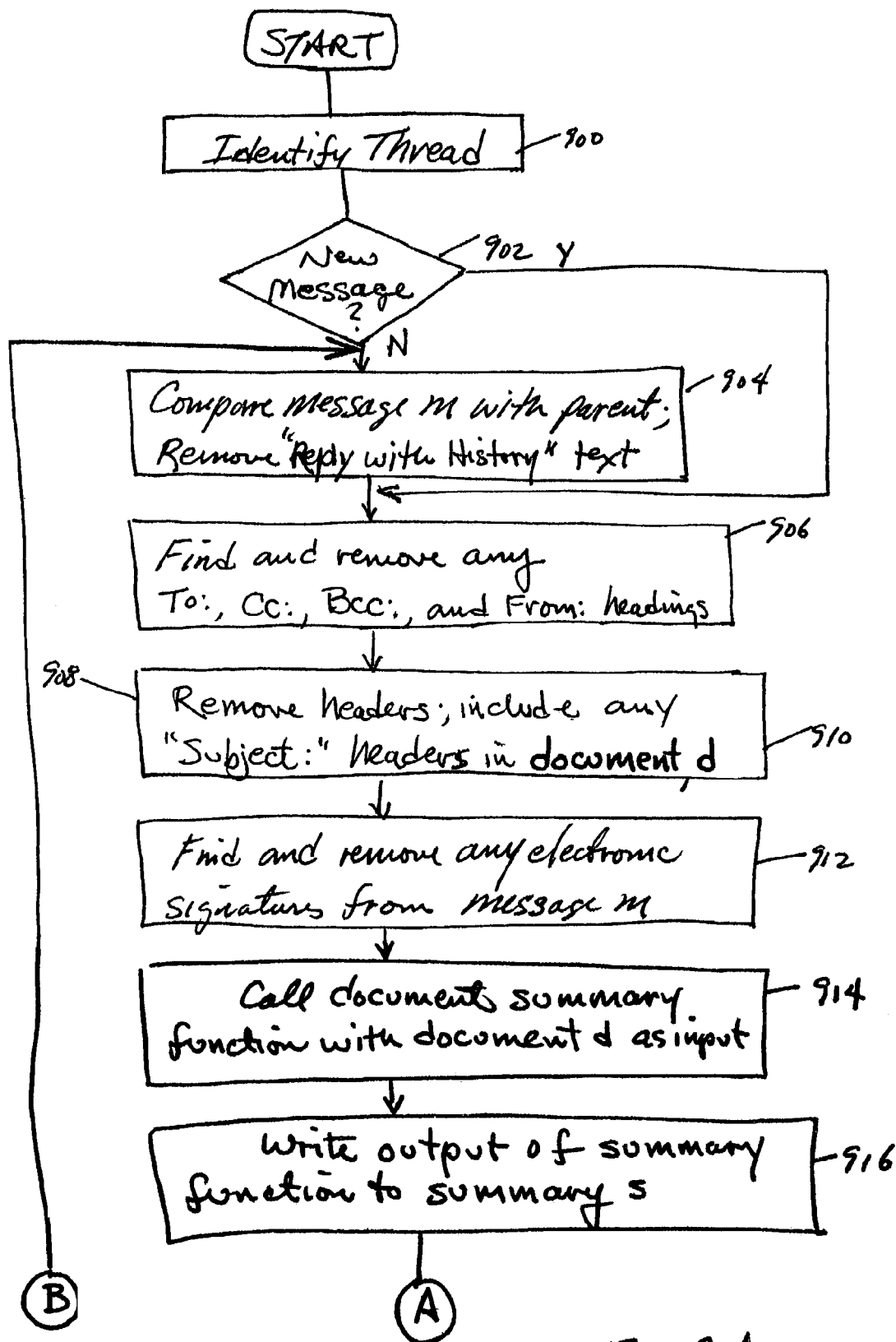
FIGS. 9A-B form a flow chart illustrating the process steps performed during the electronic mail/thread summarization process of the present invention.
Figure 9B:
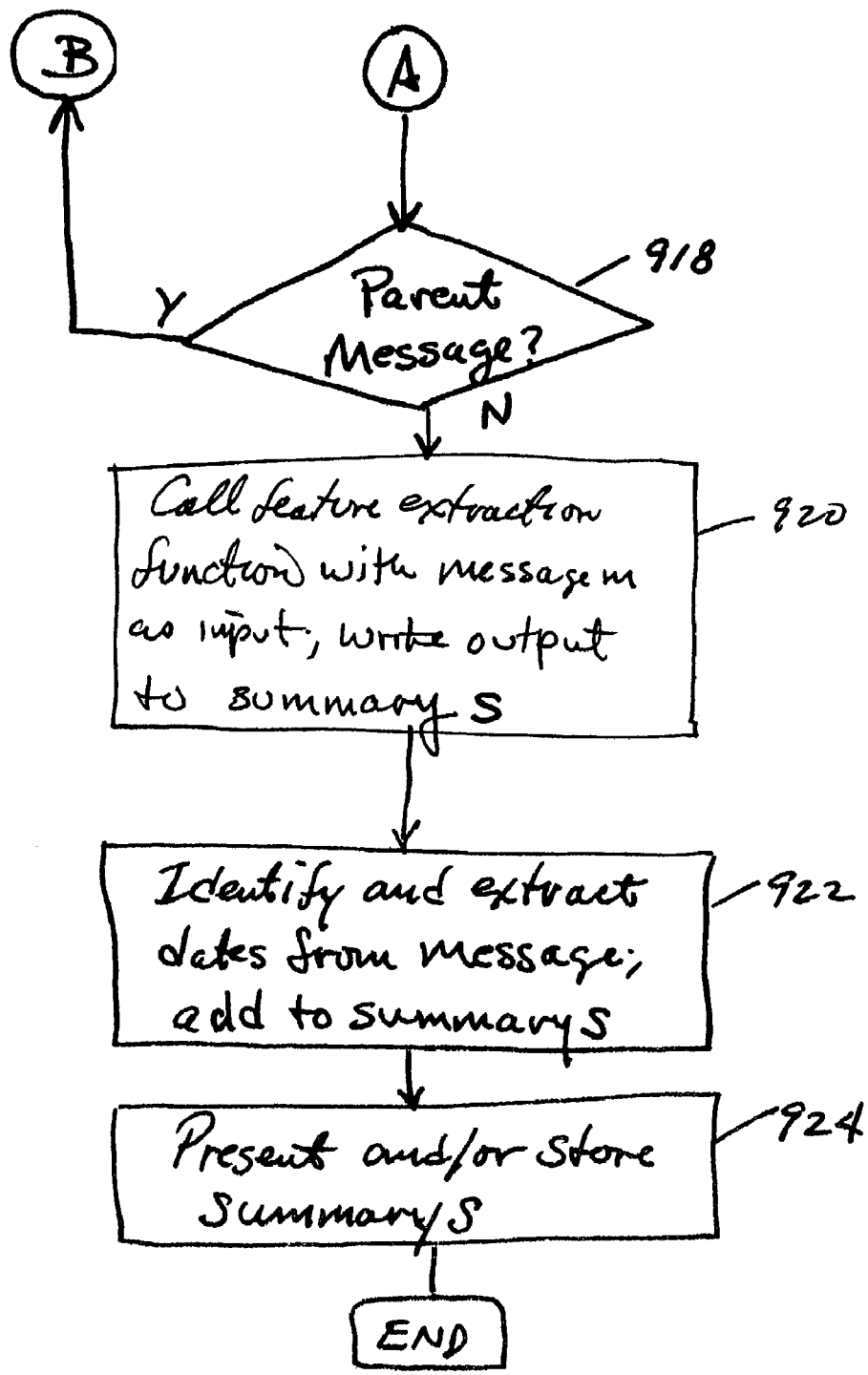

In step 912 of the electronic mail summarization algorithm described with reference to FIGS. 9A-B, text identified as an electronic signature is extracted from electronic mail message body. The inventive process uses various heuristics to identify signatures included in electronic mail messages. Examples of electronic mail signatures include:

| — | | |
|---|---|---|
| John Doe | Thanks, | -William |
| IBM Research | Jane | |
| john_doe@us.ibm.com | | |

Figure 10:
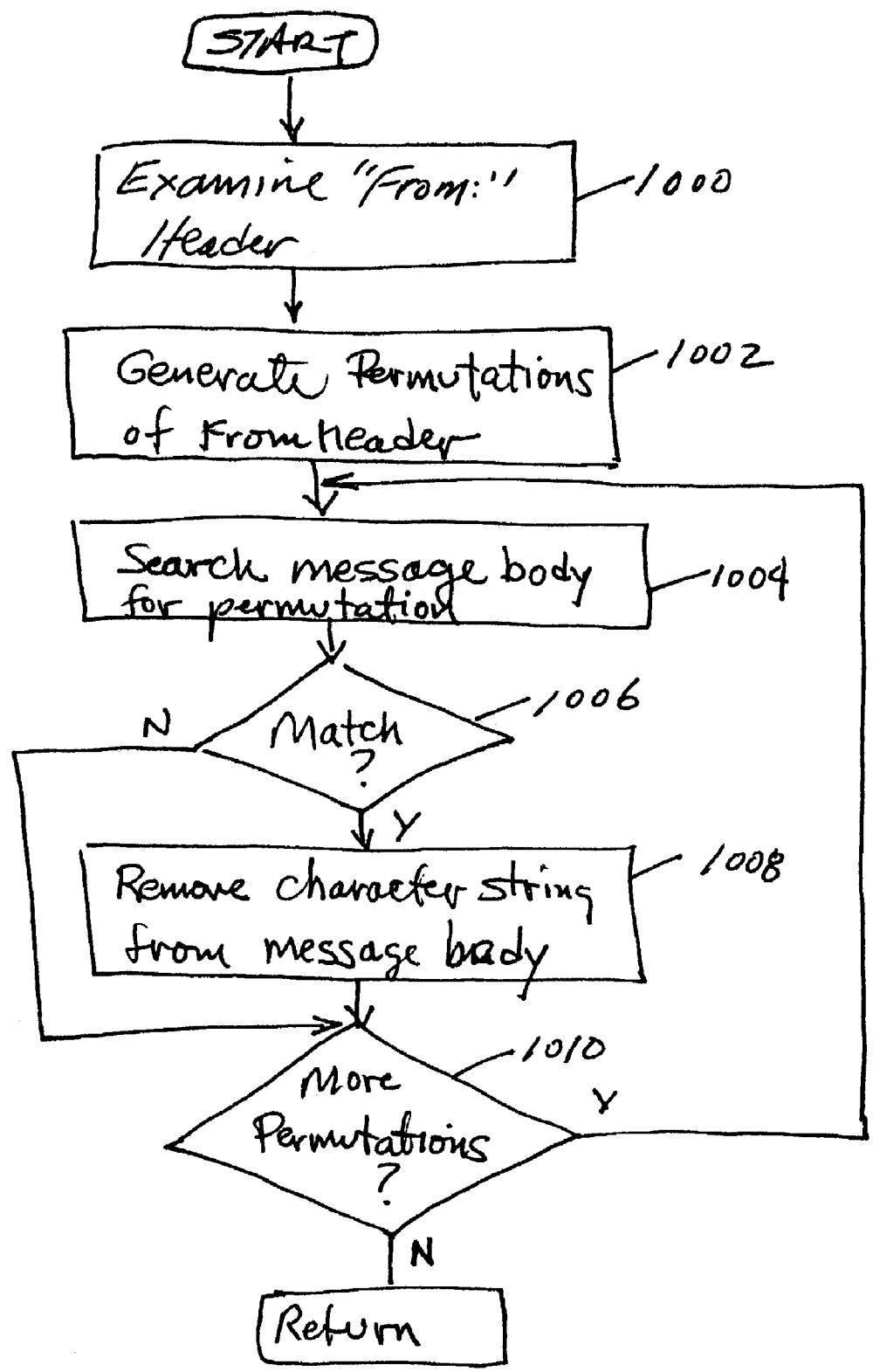
FIG. 10 is a flow chart illustrating the process steps performed during the electronic signature extraction process of the present invention.
Figure 11:
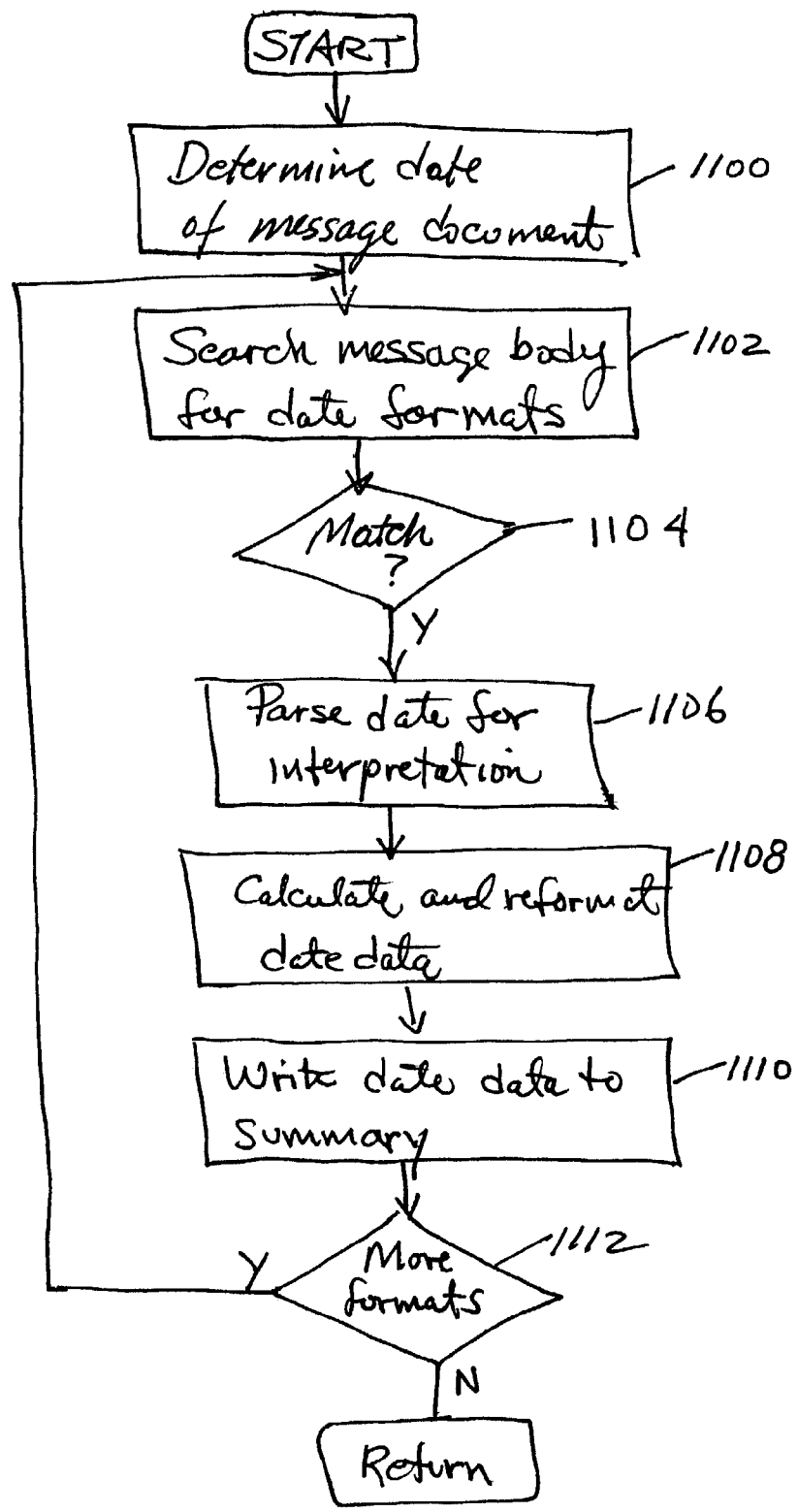
FIG. 11 is a flow chart illustrating the process steps performed during the date data extraction of the present invention.

The specific processes within electronic mail summarization algorithm for extraction of electronic signatures is set forth in the flowchart of FIG. 10 and described as follows. First, preprocessing module 265 examines the character string in the "From:" header of an electronic mail message m, as illustrated by procedural step 1000. Next, preprocessing module 265, generates a list of permutations of the character string, as illustrated by procedural step 1002. For example, if the electronic mail message was sent from John Q. Doe, then examples of permutations that would be generated include —John, John Doe, —JQD, and JD. Next, preprocessing module 265 searches the body of the electronic mail message m for those permutations, as illustrated by procedural step 1004. If a character string within the body of the electronic mail message m matches one of the permutations from the generated list, as illustrated by decisional steps 1006, preprocessing module 265 removes the character string from the message m, as illustrated by procedural step 1008. In the illustrative embodiment, preprocessing module 265 removes the block of text starting from the first signature character before the match and continuing to the next occurrence of two blank lines. Signature characters are characters used to denote the beginning of a signature. Signature characters may include, but are not limited to, "--", "_", "/" or simply a blank line. Given the above example, any signature on the form —John, John Doe, —JQD, or JD would be extracted using the above algorithm. Next, preprocessing module 265 determines if there are more permutations to be compared to the body of the electronic mail message m, as illustrated by procedural step 1010. This may be done by maintaining a count of the number of permutations for the current header character string and modifying the count each time the body of the electronic mail message m has been search for one of the permutations. Once all permutations have been searched and no other matches have been found, the body of the electronic mail message m is assumed to be free of any electronic signatures and processing returns to step 914. Alternatively, the body of the electronic mail message m may be assumed to be free of any electronic signatures once a single electronic signature has been found.

Feature Extraction

The inventive system recognizes that there are specific domains in which identifying features, such as names, dates, and company names, product names, becomes useful. In step 920 of FIG. 9B, commercially-available feature extraction software extracts relevant features in documents, including names, numbers, and names of organizations and products. In the illustrative embodiment such functions may be performed by the feature extraction capability in IBM Intelligent Miner for Text, commercially-available from IBM Corporation. It will be obvious to those skilled in the arts that any commercially-available document summarization program and any commercially-available feature extraction program could be used substituted for the IBM Intelligent Miner for Text.

In the contemplated embodiment, the feature extraction function utilized in step 920 of the summarization algorithm can be trained. Pre-training the software enhances recognition when processing new electronic mail messages. Commercially-available document summarization programs include limited learning capacity which enables them to be pre-trained. Such training typically involves processing of several documents with the document summarization module 270 and correction of errors, as well as supplying specific training examples to the program. The inventive system recognizes that features for training these summarization programs can be found in seemingly unrelated repositories, such as electronic address books and buddy lists. Accordingly, the feature extraction software can be pre-trained by aggregating contact data from users' organizer information, including electronic mail inboxes, electronic address books, and buddy lists from Lotus Sametime Connect, the Lotus Sametime client product commercially available from IBM Corporation. After extracting names from users' electronic repositories, these contact data are synthesized into a training document, to train the summarization software to recognize acquaintances listed in the user's contact lists. In this manner the extraction function of module 275 can be trained to extract the specific features associated with a particular user.

Date Extraction Algorithm

The summarization of electronic mail messages and threads is one domain in which identified dates become useful, however, some commercially-available feature extraction software does not contain the functionality needed to identify dates in documents. In step 922 of FIG. 9B of the electronic mail message summarization algorithm described above, dates found in electronic mail messages are identified, extracted and added to the summary. The algorithm to extract these dates from electronic mail message is described below with reference to the flowchart of FIG. 11 as follows. First, preprocessing module 265 determines the date associated with the electronic mail message m, as illustrated by procedural step 1100. Next, preprocessing module 265 examines the text body of electronic mail message m searching for any of a plurality of recognized date formats, as illustrated by procedural step 1102. To achieve this functionality, preprocessing module 265 attempts to match regular expressions with potential dates. For example, electronic mail messages containing any of the date formats 12-05-01, 05-12-01, Dec. 5, 2001, Dec. 5, '01, 5 December 2001, or, even "tomorrow" if that electronic mail message was sent on Dec. 4, 2001, could be identified in the text body of electronic mail message m using regular expressions. If a character string within the body of the electronic mail message m matches one of the expressions from the plurality of regular expressions, as illustrated by decisional step 1004, the character string is parsed to determine its meaning, as illustrated by procedural step 1106, and the date calculated and reformatted, as illustrated by procedural step 1008. For example, if an electronic mail message received on Dec. 5, 2001 contains the phrase "next Monday at 2," the date extraction function of preprocessing module 265 will process this date/time as Dec. 10, 2001 2:00PM. Heuristics are used to make this analysis, as well as to fill in missing information for a date/time match, such as the missing AM/PM. Another example of a heuristic for missing information is to assume a date refers to sometime within the next twelve months, if the year is missing.

Next, preprocessing module 265 writes the date data into the summary or a separate document associated with the summary, as illustrated by procedural step 1110. Next, preprocessing module 265 determines if there are more regular expression to be compared to the body of the electronic mail message m, as illustrated by procedural step 1112. This may be done by maintaining a count of the number of expressions used and modifying the count each time the body of the electronic mail message m has been search for one of the expressions. Once remaining body of the electronic mail message m has been searched and no other matches have been found, the body of the electronic mail message m is assumed to be free of any other date data. The date data found through the date extraction process and stored in conjunction with the summary may be used for searching one's inbox for electronic mail mentioning a certain date, regardless of format.

The present invention also contemplates at least two alternative embodiments of the summarization algorithms described herein. In a first alternative embodiment, each document in a conversation thread is preprocess as previously described and the results appended into a single intermediate document d which is then summarized to provide the summary document s. With this embodiment the size of the summary grows relative to the amount of material being summarized.

According to a second alternative embodiment, only the specified document is preprocessed as previously described and the results appended into a single intermediate document d which is then summarized to provide the summary document s. Such summary document s is likely to be inherently shorter since it was derived from a single document, however, the context of the surrounding document thread is not available included in such summary.

The reader can appreciate that there are alternative ways to maintain and/or compute threads within an electronic mail database, e.g., the use of In-Reply-To headers where a document refers to its parent. The shadow documents disclosed herein provide a complete conversation tree, the way that a discussion database would have complete thread trees. However, the summarization algorithm documents disclosed herein still works in situations where a complete tree is not available or cannot be computed.

A software implementation of the above-described embodiments may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. Further, many of the system components described herein have been described using products from International Business Machines Corporation. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. In a computer system operatively connectable to a network and capable of executing a communication process for sending and receiving documents, a method comprising:
   (A) summarizing a document existing at a current level of a hierarchical organization of documents;
   (B) storing the results of the summarization process of (A) in a separate summary document, said summary document being neither the document summarized and existing at the current level nor a document existing at a level of the hierarchical organization adjacent the current level;
   (C) identifying another document that exists at a level of the hierarchical organization adjacent the current level;
   (D) designating the adjacent level of the hierarchical organization as the current level of the hierarchical organization;
   (E) repeating (A) through (D) until no document exists at any level of the hierarchical organization adjacent the current level.

2. The method of claim 1 wherein (A) comprises:
   (A1) providing a document summarization function for creating a summary of a document, the summary comprising selected content of the document processed by the document summarization function.

3. The method of claim 2 further comprising:
   (G) presenting the summary document in association with the document processed by the document summarization function.

4. The method of claim 1 wherein (B) further comprises:
   (B1) storing the results of the summarization process in (A) in a shadow document.

5. The method 1 wherein (A) comprises:
   (A1) extracting any of extraneous headers, quoted text, forward information, and electronic signatures form the document during the summarization process.

* * * * *